Dec. 24, 1968  D. J. DEAN  3,418,576
METER ASSEMBLY WITH EXPANDABLE CLAMPING RING
Filed July 1, 1964  4 Sheets-Sheet 1
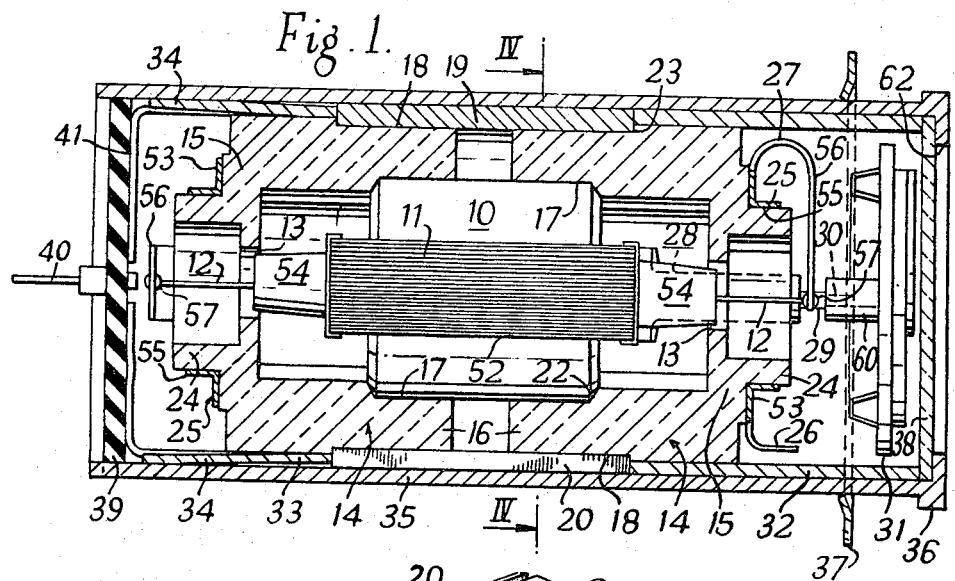
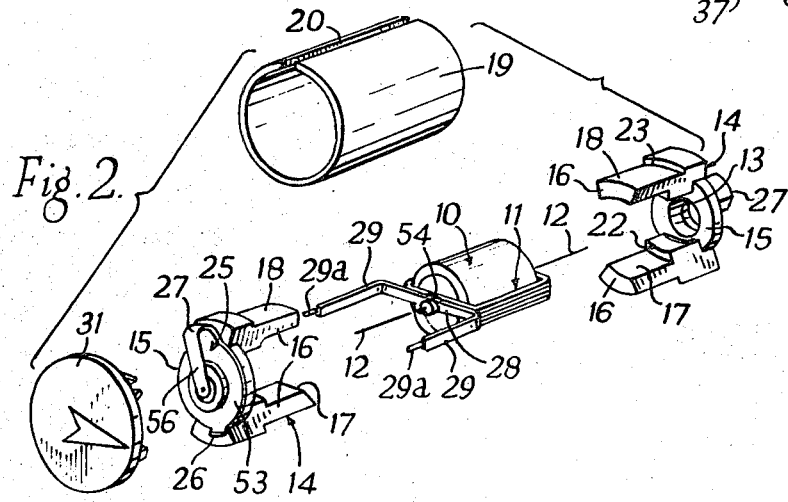
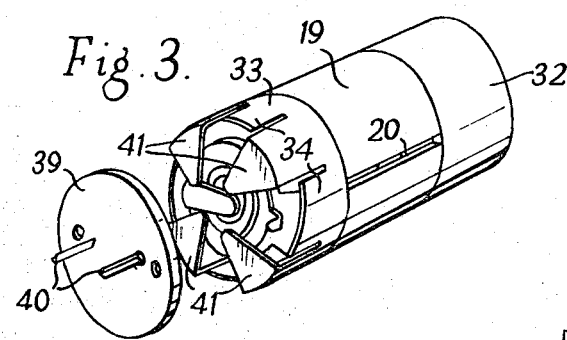
INVENTOR
DEREK JOHN DEAN
BY Michael P. Breston
ATTORNEY Dec. 24, 1968  D. J. DEAN  3,418,576
METER ASSEMBLY WITH EXPANDABLE CLAMPING RING
Filed July 1, 1964  4 Sheets-Sheet 2
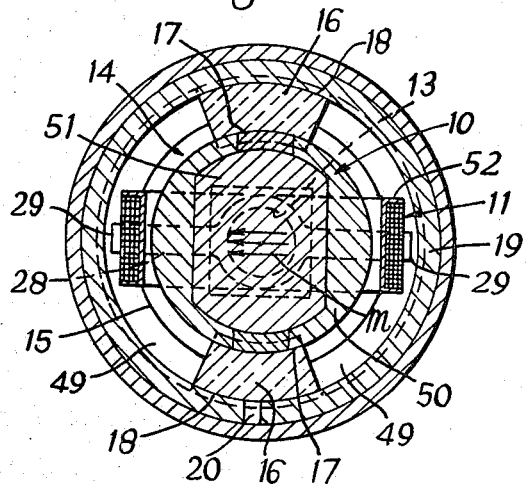
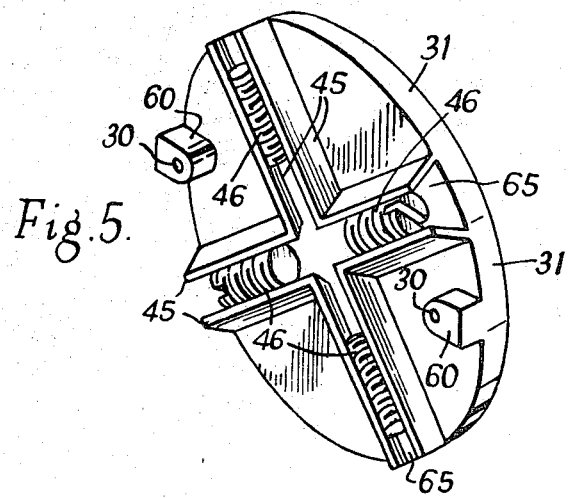
INVENTOR
DEREK JOHN DEAN
BY
Michael P. Breston
ATTORNEY Dec. 24, 1968 D. J. DEAN 3,418,576
METER ASSEMBLY WITH EXPANDABLE CLAMPING RING
Filed July 1, 1964 4 Sheets-Sheet 3
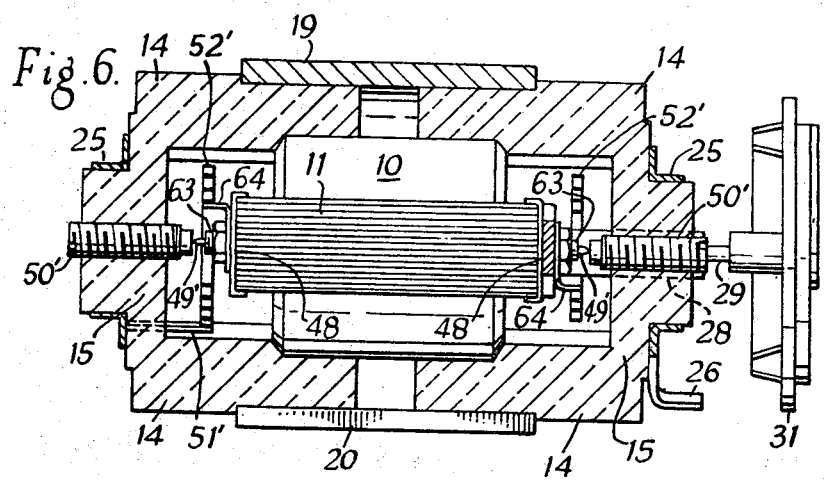
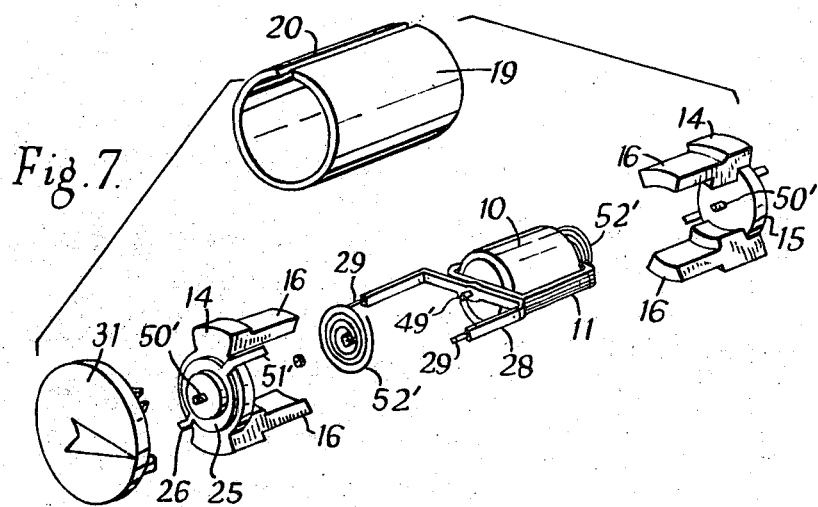
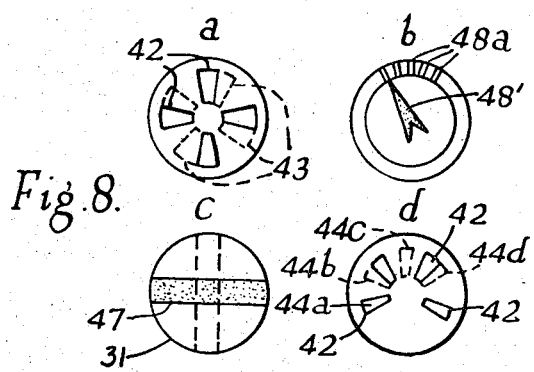
INVENTOR
DEREK JOHN DEAN
BY
Michael P. Breston
ATTORNEY Dec. 24, 1968  D. J. DEAN  3,418,576
METER ASSEMBLY WITH EXPANDABLE CLAMPING RING
Filed July 1, 1964  4 Sheets-Sheet 4

INVENTOR
DEREK JOHN DEAN
BY
Michael F. Breston
ATTORNEY

United States Patent Office 3,418,576
Patented Dec. 24, 1968

3,418,576
METER ASSEMBLY WITH EXPANDABLE
CLAMPING RING
Derek John Dean, Pottersbar, Middlesex, England, assignor to Weston Instruments, Inc., Newark, N.J., a corporation of Delaware
Filed July 1, 1964, Ser. No. 379,534
Claims priority, application Great Britain, July 11, 1963, 27,574/63
13 Claims. (Cl. 324—151)

ABSTRACT OF THE DISCLOSURE

A semaphore type meter assembly with a magnetized core and a moving coil extending around the core. Separate support members mount the opposite ends of the coil for pivotal movement of the coil. The support members each have limbs that extend axially of and engage around the core. An expandable magnetic material ring radially presses the limbs against the core to secure the assembly together, the ring forming a portion of the magnetic circuit of the meter. Indicator supporting arms extend beyond and support the indicator at a location beyond the end of one of the supports.

---

This invention relates to electrically operated indicator devices of the kind frequently referred to as the "semaphore" type in which a member, such as a disc or an arm, is rotated through an angle to change the visual display presented thereby.

One object of the invention is to provide a simplified construction of a device of small physical size and compact form having a minimum number of component parts with consequent reduction of manufacturing cost.

Another object of the invention is the provision of an indicator device comprising a central cylindrical core of magnetic material containing a permanent magnet polarized to define a diametrically directed magnetic axis, a movable coil winding embracing such core, first and second opposite end support members carrying means for mounting such movable coil winding for rotation about an axis coincident with that of the central core, said end support means each being provided also with axially projecting spaced limbs shaped to fit telescopically over said core, a surrounding magnetic return ring in the form of a length of tubing and adapted to embrace and grip each of said end support members thereby to hold the parts in proper assembled relationship while additionally forming the outer pole surfaces of the magnetic flux gaps within which the said moving coil winding operates, at least one longitudinally directed arm attached to the movable coil winding and projecting past said first end support member through a gap between the said limbs thereof and a visual indicator member secured to the free end of such arm. Two indicator support arms in the form of a U-shaped member are preferably provided.

The moving coil is preferably pivotally supported by a taut suspension system comprising a ligament extending from each end of the movable coil to securing means attached to the adjacent end support member. In an alternative form where point/jewel type pivot bearings are employed the pivot points may be secured to the movable coil winding in the conventional manner and the requisite bearing jewels are carried by adjustable pivot screws carried in the two opposing end support members.

The visual indicator is conveniently in the form of a disc. This disc may carry a variety of different types of markings depending upon the form of the display required including a normal semaphore bar, an arrow head, or one or more patches of distinctive colour and shape adapted to co-operate with a number of light transmitting areas of an otherwise opaque stationary mask mounted in front of and parallel with the said indicator disc.

In order that the above and other objects and features of the invention may be more readily understood, a number of embodiments thereof will now be described by way of illustrative example only and with reference to the accompanying drawings in which:

FIGURE 1 is an axial cross sectional view through one particular constructional form of miniature electrical indicator embodying the invention and employing a taut ligament form of suspension for the moving sytem.

FIGURE 2 is an exploded pictorial view of certain of the operative component parts of the device shown in FIG. 1.

FIGURE 3 is a perspective view of partially assembled components of the device of FIGS. 1 and 2 prior to their insertion in a protective casing.

FIGURE 4 is a transverse cross-sectional view taken on the line IV—IV of FIG. 1.

FIGURE 5 is a perspective view of a preferred form of the visual indicator disc of the device of FIGS. 1–4.

FIGURE 6 is an axial cross sectional view, similar to FIG. 1, showing an alternative construction employing a pivotal bearing type of support for the moving system.

FIGURE 7 is an exploded view, similar to FIG. 2, of the alternative construction shown in FIG. 6.

FIGURE 8, at a, b, c and d shows a number of alternative forms of visual display capable of being provided by a device of either of the basic forms shown in the earlier figures.

Figure 9:
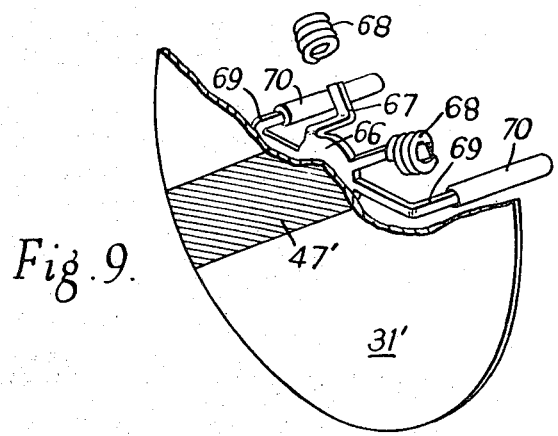

FIGURE 9 is a perspective view, partly cut away, showing an alternative form of indicator disc.

Figures 10, 11:
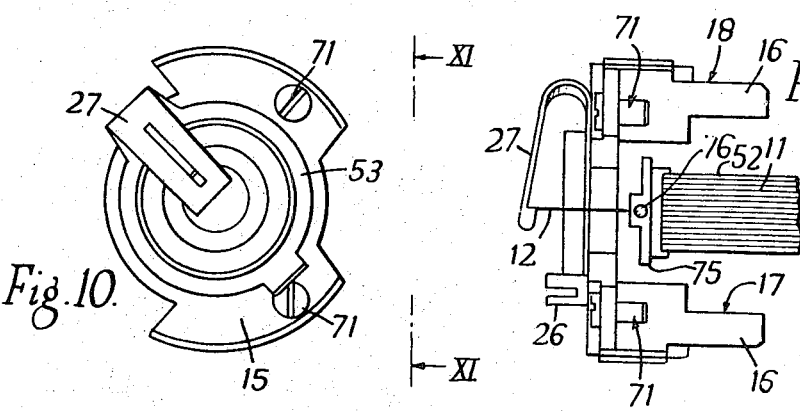

FIGURE 10 is an end view of a zero or end stop member showing one form of end position adjustment device for the indicator.

FIGURE 11 is a side view taken along the line XI—XI of FIG. 10, while

Figure 12:
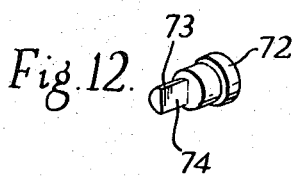

FIGURE 12 is a perspective view of an end stop for use as an end position adjustment device for the indicator.

Referring more particularly to FIGS. 1 to 4 of the drawings, the miniature electrical indicator shown therein comprises a central core 10 consisting of a shell 50 of magnetic material, such as soft iron or mild steel, which is of cylindrical form externally and contains a permanent magnet 51 disposed so as to magnetize the core diametrically as indicated by the arrows m (FIG. 4). This core 10 is embraced by a rectangular shaped movable coil winding 11 which is of conventional form including a rigid channel section support frame 52 carrying the multi-turn winding. Secured to the centre points of the opposite transverse limbs of the movable coil frame 52 are anchorage blocks 54 for the respective inner ends of taut suspension ligaments 12 used to support the coil winding for arcuate movement about an axis coincident with that of the core 10.

The ligaments 12 extend one through each of circular central apertures 13 in end support members 14. The two end support members 14 are of identical shape and are formed by molding from a suitable plastic material of electrical insulating character. Each support member comprises a disc-shaped body part 15 disposed normal to the axis of the core 10 and coaxial therewith while from diametrically disposed points on one side of each disc part 15 there extends, in a direction parallel with the core axis, two diametrically opposed segmental section bifurcations or limbs 16. The inner surfaces of these limbs are recessed as shown at 17 to adapt their ends remote from the disc part 15 to engage snugly with the outer surface of the core 10 over nearly half of its length. The outer surfaces of such limbs 16 are also slightly recessed as shown at 18 to provide cylindrical surfaces concentric with the axis of the core 10 and which are adapted snugly to be engaged by the inner cylindrical surface of a soft iron magnetic flux return ring 19. Such ring is conveniently in the form of a length of tubing which is sp'it axially as indicated at 20. Shoulders 22 and 23 at the ends of the respective recessed surface regions 17 and 18 on each limb 16 of each end support member 14 serve to abut respectively against the end surfaces of the core 10 and of the flux-return ring 19 whereby the end support members are located at a predetermined spacing from one another. On the opposite, outwardly facing, surface of each disc part 15 there is formed an integral tubular extension 24 also concentric with the axis of the core 10. A member 25 of resilient sheet metal includes a ring shaped central part 53 having a flanged aperture 55 which is force fitted upon the tubular extension 24 of the support member 14. Each member 25 is provided with an integral electrical connection tab 26 lying diametrically opposite to a radially directed bent arm 27 which, by its returned free end 56, extends across and overlies the aperture 13 in the adjacent end support member 14. The free end 56 of this arm is arranged to be secured, as by means of soldered connection 57, to the outer end of the associated ligament 12 and, by prestressing of the bent arm 27, to maintain the two ligaments in an appropriate state of tension with the movable coil winding 11 free to rotate within the annular gap between the core 10 and the flux return ring 19.

As shown more clearly in FIG. 2 one of the transverse limbs of the movable coil winding 11 also has secured thereto, e.g. by means of a thermosetting adhesive, and/or by mechanical interconnection with the adjacent anchor block 54, a U-shaped stirrup 28 having its two parallel longitudinally directed side arms 29 positioned to project one through each of the two diametrically opposed gaps 49 between the limbs 16 of the adjacent end support member 14. The two arms 29 of this stirrup member 28 each have pin-like terminations 29a at their free ends. These are adapted to be press fitted within socket holes 30 formed in integral bosses 60 on one side of an indicator disc 31, the nature of which is shown more clearly in FIG. 5 and will be described later.

In the assembly of the components so far described the movable coil winding 11, having the inner ends of the support ligaments 12 attached thereto, is first placed over the core 10 and a first end support member 14 then fitted snugly onto the core at the end opposite to the stirrup 28 of the coil winding 11 after passage of the, at present, free end of the ligament 12 at that end of the coil winding through the central aperture 13 of the member 14. A wedge is temporarily fitted in the split 20 of the flux return ring 19 to expand it and this ring is then placed over the core 10, coil winding 11 and single, already fitted, end support member 14 while the other end support member is located in position on the other end of the core 10 with the arms of the stirrup 28 projecting between the limbs or bifurcations 16 of such end support member. The respective limbs 16 of the two end support members 14 are brought into axial alignment and then positioned so as to lie in an axial plane which is at right angles to the axial plane including the magnetic polarization direction m of the core 10.

The wedge within the split 20 is then removed to allow the flux return ring 19 to contract and thereby to clamp the assembled parts in rigid concentric relationship. The taut suspension ligaments 12 are anchored to the movable coil winding and to the arms 27 by soldering or in any other convenient way such as for instance in the manner described in co-pending U.S. patent application No. 316,321 now Patent No. 3,193,896. The respective ligaments 12 are preferably of metal to form also means for conducting current to the moving coil winding. Such ligaments preferably also provide, by their resistance to torsional stress, a controlling or biasing force for returning the moving coil winding to a chosen zero or datum position.

It will be observed that the anchorage blocks 54 provided on the moving coil 11 for the inner ends of the suspension ligaments project, when the parts are assembled, into the central apertures 13 of the end support members 14. A sufficient but nevertheless limited amount of clearance is provided between the opposing parts to permit normal free rotation of the moving system when in operation while providing also means which prevent excessive sideways displacement of the moving systems such as might cause breakage of the suspension ligaments and which may be due, for example, to sudden shock.

The movable coil winding 11 with its attached stirrup 28 has a range of movement which may be of the order of 90° or even more in between two opposite limit stops which are constituted by the radial side surface of the limbs 16 of each end support member 14 when engaged by the frame 52 of the coil winding. The indicator disc 31 is then fitted to the pin ends 29a of the stirrup 28 after which the assembly is provided, as shown more clearly in FIG. 3, with a spacing ring 32 at one end and a spring retaining sleeve 33 at the other end.

The sleeve 33 is provided with four equi-spaced and outwardly deflected spring tongues 34 which are arranged to engage and grip the inner surface of a tubular outer casing 35 into which the assemblage is placed. This casing 35 is provided at one end with an outwardly directed flange 36 for mounting upon a panel with the aid of a "push-nut" type retaining ring 37. The same end of the casing has an inwardly directed flange 62. The spacing ring 32 fits snugly over the larger diameter outer surfaces of the limbs 16 of one end support member 14 and abuts by one end against the adjacent end of the flux return ring 19 and by its other end against a mask plate or window 38 which is thus held against the inner surface of the flange 62.

The opposite end of the casing 35 is provided with a disc-shaped closure plate 39 of electric insulating material having terminal pins, soldering tabs or the like as shown at 40 and to which the respective connecting tabs 26 of the members 25 are electrically connected by means of wires (not shown). The connecting wire from the tab 26 near the front end of the device, i.e. that adjacent the indicator disc 31, may be passed through one of the pairs of aligned gaps 49 between the limbs 16, or more preferably, through special holes or channels therefor formed during moulding of the end support members 14. Four further and inwardly bent radial spring tongues 41 on the sleeve 33 cooperate with the end closure plate 39 after sealing of the latter within the end of the casing 35 to maintain the fixed parts of the assembly clamped in the relative positions shown. The end closure plate 39 may be retained by means of adhesive, the hot sealing together of plastic parts, by the use of a spring C-ring located in an internal groove around the casing wall or any other suitable means, for instance, screws. Where a hermetically sealed construction is required, sealing means such as a gasket will, of course, be provided for the mask plate or window 38.

FIGS. 6 and 7 show a generally similar construction in which the more usual form of jewelled pivot bearings are employed for rotatably mounting the moving system instead of the taut suspension arrangements of FIGS. 1–4. In these figures parts similar to those already described have been given like reference characters and will not again be specifically described.

In this modification, each transverse end limb of the moving coil winding 11 is provided with a pivot mounting plate 48 including a screwed stud 63 and a pivot point 49′. The latter co-operate with jewels carried at the inner ends of bearing screws 50′ carried at the centres of the disc parts 15 of the end support members 14, such disc parts being now solid instead of tubular as in the embodiment of FIGS. 1–4. The flanged ring members 25, although provided as before with a connecting tab 26, are now formed with a radially directed integral spring anchorage arm 51' which is bent at right angles at a point along its length so as to project towards the central core 10 through one of the arcuate gaps 49 around the outer edge of each of the disc parts 15 between the limbs 16 of the end support members 14. A spiral spring 52' of usual form for acting as a control medium and as means for conducting current to the moving coil winding 11, is connected between the inner end of each arm 51' and an anchor tab 64 secured to the pivot stud 63 at the related end of the moving coil. It will be understood that an assemblage of the form shown in FIGS. 5 and 6 is mounted within a protective casing like that shown at 35 in FIG. 1 in a manner analogous to that already described in connection with the first embodiment.

A device of either of the forms described can be arranged to provide an indicator disc rotary movement of the order of 90°. This movement can, of course, be in either direction from a mid-zero or rest position according to the direction of current flow through the moving coil. Alternatively, and again in well known manner, the movement may be in one direction only from a zero or rest position at one end if the current flow is restricted to one direction only. For most forms of indicator function the second form of operation is preferable.

The indicator disc 31 and its associated mask plate or window 38 may be modified to give a variety of different forms of indication. For instance as shown in FIG. 8c, the disc 31 may be provided with a single transverse bar 47 of distinguishing colour to act as a normal semaphore signal arm. In this form the window 38 is preferably completely transparent. Alternatively the said disc 31 may be provided with a pointer or arrow head symbol as shown at 48' in FIG. 8b. This may be arranged to cooperate with a series of arcuately disposed markings 48a around the margin of an otherwise transparent window 38 of the casing. In other forms of display, the casing may be provided with an opaque mask plate 38 having a series of transparent apertures therein as shown at 42 in FIGS. 8a and 8d. Referring more particularly to FIG. 8a, four symetrically displaced sector-shaped apertures 42 may be provided to cooperate with four corresponding patches 43 of paint or the like on the indicator disc 31 so that in one position of the disc none of the said patches are displayed whereas in the opposite position all of the apertures are backed by an area of distinctive colour. In the other form shown in FIG. 8d a series of apertures 42 at different angular positions are provided in the mask plate (which may be an end wall of the casing) and these cooperate with a corresponding number of patches 44a, 44b, 44c and 44d of paint or the like which patches are arranged to be displayed one after the other individually through successive ones of the apertures 42 as the indicator disc is rotated. By such an arrangement an apparent movement of the order of 180° or even more may be obtained with a moving coil movement restricted to one of the order of 90°.

For the purpose of convenient manufacture of the indicator disc 31 by a plastic moulding method while still affording suitable balancing facilities the disc may be as shown in FIG. 5 having two pairs of diametrically disposed walls 45 set at right angles to each other on the inward side thereof. The respective walls of each pair are inclined to one another to define between them a retaining groove 65 for one or more screw-threaded balancing weights 46 whose position, measured radially from the axis of the disc, may be varied by rotation. Such adjustable position weights 46 constitute means for balancing the whole of the rotatable system of the device.

The indicator disc 31 need not, however, be made of a plastics material but can also be made of a metal or metal alloy, such as aluminium, for example. In such case, an alternative design such as illustrated in FIG. 9 is preferred. This arrangement comprises a circular metal disc 31' and although a single transverse bar 47' is shown on the disc, any marking arrangement such as illustrated in FIGS. 8a, 8b, 8c or 8d can equally well be used. Instead of having moulded walls 45 (FIG. 5) the metal disc has a spider 66 arranged to be secured thereto by any suitable means. This spider 66 has four radially outwardly extending arms 67 spaced at 90° from one another and each arranged to carry a balancing weight 68. The spider also has two arms 69 extending axially of the indicator system and at right-angles to the arms 67. These axially extending arms 69 are disposed at diametrically opposed sides of the spider and have thickened end portions 70 which are apertured to receive the pins 29a (FIG. 2) fitted on the stirrup 28. In this manner the disc 31' is rotatable in dependence on movement of the coil 11.

Another feature of the invention is ilustrated in FIGS. 10–12. These figures illustrate a method of obtaining a zero or end stop adjustment. In the earlier described embodiments the coil 11 was limited in its angular movement by the radial side surfaces of the limbs 16 of each end support member 14 when engaged by the frame 52 of the coil winding. In the arrangement of FIGS. 10–12 two end stops 71 of synthetic plastic or other material are inserted through apertures in the disc-shaped body part 15 of one of the end support members 14. These two stops 71 are spaced from one another by 90° and each comprises a screw head portion 72 and an elongated reduced diameter extension 73 which has a flat surface 74 so as to form a peg of substantially semi-circular cross-section. These stops 71 are inserted into one of the end supports 14 so that the semi-circular section portions extend axially towards the moving coil 11. The moving coil frame 52 is provided with a mounting member 75 which carries a rod-shaped stop arm 76, and this arm is arranged to extend radially on each side of the mounting member 75 so that it can engage one of the stops 71 upon rotation of the moving coil 11. Therefore, by rotation of the stops 71 by means of the screw adjustment, the flat surface 74 is rotated and provides a range of adjustment for the limit position of the stop arm 76.

Numerous modifications of detail may clearly be made without departing from the invention as defined in the appended claims. For example, the flux return ring 19 which serves also as the clamping means for retaining the major parts in position may be split along a helical line instead of a rectilinear one parallel to the core axis as shown. Alternatively the necessary resilient contractive effect may be obtained by providing several longitudinal slots extending from each end towards the middle of the ring, the slots at one end not meeting those at the other end. Such modification is less satisfactory and less convenient for assembly than the expansible split ring form described.

As an additional modification, the return ring 19 may be provided with a tapped hole diametrically opposite the split 20. The provision of such a tapped hole enables the flux return ring to be rigidly secured by means of a screw and therefore to be secure against displacement by shocks and vibration.

Although the two end support members 14 have been described and illustrated as being identical they need not necessarily be so in order to achieve the objects of the invention.

Moreover, although the core has been described as a central magnet core surrounded by a soft iron shell, the core can also be formed wholly of magnetic material without exceeding the scope of the invention.

I claim:

1. An electrically operated indicator device comprising a cylindrical core of magnetic material containing a permanent magnet polarized to define a diametrically directed magnetic flux axis in said core, a movable coil winding embracing said core, two separate opposite end support members each including means for mounting said movable coil winding for rotation about an axis coincident with that of said central core, said support members each being provided with axially projecting spaced limbs shaped to fit telescopically over said core at circumferentially spaced regions thereof, said limbs of the respective members extending toward each other from opposite ends of the core, a tubular ring of magnetic material arranged co-axially with said core and overlapping and embracing each of said limbs of said end support members to hold such members and the core in proper assembled relationship and forming a magnetic return ring for the magnetic flux of said core and defining the outer pole surfaces of a flux gap within which said moving coil can operate, at least one longitudinally directed arm extending from said moving coil winding beyond one of said end support members and through a gap between the spaced limbs and to one side of said means mounting said movable coil winding for rotation at said one end support member, and a visual indicator member secured to the free end of said arm and disposed at a location beyond said one end support member.

2. An indicator device according to claim 1 in which said tubular magnetic flux return ring is radially expansible by the provision of one or more longitudinally directed slits therein.

3. An indicator device according to claim 1 which includes a taut ligament suspension system for said movable coil winding including fixed ligament anchorage means mounted on said end support member.

4. An indicator device according to claim 3 in which each of said fixed ligament anchorage means comprises a spring metal blade to which the outer end of one of said ligaments is attached.

5. An indicator device according to claim 4 which includes an anchorage for the inner end of each ligament secured to the movable coil winding, each of said anchorages comprising a part positioned within an axial aperture in the associated end support member, the respective sizes of said part and said aperture being such as to allow free rotation of the movable coil under normal conditions while preventing excessive sideways displacement of the movable coil winding by shock.

6. An indicator device according to claim 5 in which the outward ends of said end support members are shaped to define an axially directed tubular bushing, said bushing forming a mounting for the aforesaid spring metal blade of said taut suspension system.

7. An indicator device according to claim 1, in which at least one of said end support members is provided with limit position adjustment means arranged to engage a stop member rigidly connected to said movable coil winding.

8. An indicator device according to claim 7, in which said limit position adjustment means comprises two adjustable pegs disposed through one of said end support members, each of said pegs having a portion of substantially semi-circular cross-section for engagement with said stop member.

9. An electrically operated indicator device comprising a cylindrical core of magnetic material containing a permanent magnet polarized to define a diametrically directed magnetic flux axis in said core, a movable coil winding embracing said core, two separate opposite end support members each including means for mounting said movable coil winding for rotation about an axis coincident with that of said central core, said support members each being provided with axially projecting spaced limbs adapted to fit telescopically over said core at circumferentially spaced regions thereof, a tubular ring of magnetic material split longitudinally from end-to-end and arranged co-axially with said core to overlap and embrace each of said limbs of said end support members thereby to hold such members and the core in proper assembled relationship, forming a magnetic return ring for the magnetic flux of said core, and defining the outer pole surfaces of a flux gap within which said moving coil can operate, at least one longitudinally directed arm extending from said moving coil winding beyond one of said end support members and through a gap between the spaced limbs of said end support member, and a visual indicator member secured to the free end of said arm beyond said end member.

10. A miniature axially elongated electrically operated indicator device comprising a cylindrical core of magnetic material containing a permanent magnet polarized to define a diametrically directed magnetic flux in said core, a movable coil winding embracing said core, two separate opposite end support members each including mounting means for mounting said movable coil winding for rotation about an axis coincident with that of said central core, said mounting means each being beyond the ends of the core, said support members each being provided with two axially projecting and diametrically opposed spaced limbs adapted to fit telescopically over said core at circumferentially spaced regions thereof, said limbs extending over the core from opposite ends thereof, an elongated tube of magnetic material having a dividing slot from end-to-end arranged co-axially with said core and overlapping and engaging each of said limbs of said end support members to hold such members and the core in proper assembled relationship, forming a magnetic return ring for the magnetic flux of said core, and defining the outer pole surfaces of a flux gap within which said moving coil can operate, a pair of axially extending arms extending from diametrically opposed points at one end of said moving coil winding and through the respective gaps between the limbs of one of said support members, said arms extending beyond the end of said one end support member along paths offset from the axis of said core and a visual indicator member secured to the free ends of said arms at a location beyond the end of said one end support member, said indicator having radial dimensions smaller than those of said tube.

11. An electrically operated indicator device comprising a cylindrical core of magnetic material containing a permanent magnet polarized to define a diametrically directed magnetic flux axis in said core, a movable coil winding embracing said core, two opposite separate end support members each including a body part carrying means for mounting said movable coil winding for rotation about an axis coincident with that of said central core, said support members each being provided with two diametrically opposed spaced limbs projecting axially from said body part and adapted to fit telescopically over said core at circumferentially spaced regions thereof, a tubular ring of magnetic material having a dividing slot extending axially from end-to-end arranged co-axially with said core and overlapping and embracing each of said limbs of said end support members to hold such members and the core in proper assembled relationship whilst forming a magnetic return ring for the magnetic flux of said core and defining the outer pole surfaces of a flux gap within which said moving coil can operate, a U-shaped indicator support secured to one end of said moving coil winding, said support having two parallel longitudinally directed arms which extend past one of said end support members in the respective gaps between the spaced limbs of said end support member and a visual indicator member secured to the free end of said arms.

12. An electrically operated indicator device comprising a cylindrical core of magnetic material containing a permanent magnet polarised to define a diametrically directed magnetic flux axis in said core, a movable coil winding embracing said core, two separate opposite end support members each including a disc-shaped body part, means on said body part for mounting said movable coil winding for rotation about an axis coincident with that of said central core, said disc-shaped body part of said support members each being provided with two axially projecting and diametrically opposed spaced limbs adapted to fit telescopically over said core at circumferentially spaced regions thereof, a split tubular ring of magnetic material arranged co-axially with said core and overlapping and embracing each of said limbs of said end support members to hold such members and the core in proper assembled relationship forming a magnetic return ring for the magnetic flux of said core and defining the outer pole surfaces of a flux gap within which said moving coil can operate, a pair of longitudinally directed arms extending from said moving coil winding past one of said end support members in the respective gaps between the spaced limbs of said end support member and a visual indicator disc secured to the free end of said arms beyond said support member.

13. An electrically operated indicator device comprising a cylindrical core of magnetic material containing a permanent magnet polarised to define a diametrically directed magnetic flux axis in said core, a movable coil winding embracing said core, first and second separate opposite end support members formed of moulded plastic insulating material and each including means for mounting said movable coil winding for rotation about an axis coincident with that of said central core, said support members each being provided with integral axially projecting spaced limbs adapted to fit telescopically over said core at circumferentially spaced regions thereof, a radially expansible tubular ring of magnetic material arranged co-axially with said core and overlapping and embracing each of said limbs of said end support members to hold such members and the core in proper assembled relationship, forming a magnetic return ring for the magnetic flux of said core, and defining the outer pole surfaces of a flux gap within which said moving coil can operate, at least one longitudinally directed arm extending from said moving coil winding past said first end support member in a gap between the spaced limbs of said first end support member and a visual indicator member secured to the free end of said arm.

References Cited
UNITED STATES PATENTS

| | | | |
|---|---|---|---|
| 2,250,969 | 7/1941 | Seefeld | 324—151 X |
| 2,887,657 | 5/1959 | Lamb et al. | 324—154 X |
| 2,926,306 | 2/1960 | Stegner | 324—154 |
| 2,978,640 | 4/1961 | Arbeiter et al. | 324—151 |
| 3,111,623 | 11/1963 | Thomander | 324—154 |

FOREIGN PATENTS 899,106 6/1962 Great Britain.

RUDOLPH V. ROLINEC, *Primary Examiner.*

A. E. SMITH, *Assistant Examiner.*

U.S. Cl. X.R.

324—154; 335—222

UNITED STATES PATENT OFFICE
CERTIFICATE OF CORRECTION

Patent No. 3,418,576                        December 24, 1968

Derek John Dean

It is certified that error appears in the above identified patent and that said Letters Patent are hereby corrected as shown below:

Column 8, line 11, after "flux" insert -- axis --.

Signed and sealed this 24th day of March 1970.

(SEAL)
Attest:

Edward M. Fletcher, Jr.                      WILLIAM E. SCHUYLER, JR.
Attesting Officer                               Commissioner of Patents